(12) United States Patent
Lukis et al.

(10) Patent No.: US 7,299,101 B2
(45) Date of Patent: Nov. 20, 2007

(54) MANIPULATABLE MODEL FOR COMMUNICATING MANUFACTURING ISSUES OF A CUSTOM PART

(75) Inventors: Lawrence J. Lukis, Wayzata, MN (US); Matthew Hartloff, Plymouth, MN (US)

(73) Assignee: The Protomold Company, Inc., Maple Plain, MN (US)

( * ) Notice: Subject to any disclaimer, the term of this patent is extended or adjusted under 35 U.S.C. 154(b) by 0 days.

(21) Appl. No.: 11/369,120

(22) Filed: Mar. 6, 2006

(65) Prior Publication Data

US 2007/0208452 A1    Sep. 6, 2007

(51) Int. Cl.
*G06F 19/00* (2006.01)

(52) U.S. Cl. .................. 700/98; 700/105; 345/619; 345/653

(58) Field of Classification Search ............. 700/97, 700/98, 105, 108, 109, 110, 182, 197, 200; 345/419, 420, 619, 649, 650, 653
See application file for complete search history.

(56) References Cited

U.S. PATENT DOCUMENTS

| | | | |
|---|---|---|---|
| 5,987,469 | A | 11/1999 | Lewis et al. |
| 6,675,055 | B1 | 1/2004 | Fischer |
| 6,701,200 | B1 | 3/2004 | Lukis et al. |
| 6,836,699 | B2 * | 12/2004 | Lukis et al. ............... 700/200 |
| 2005/0125092 | A1 | 6/2005 | Lukis et al. |

OTHER PUBLICATIONS

"IRONCAD Getting Started Guide", 2005, IronCAD, http://www.ironcad.com/product/gettingstarted.pdf.*

"3DCaliper", RAND Worldwide, 2003, http://products.engineering.com/uploads/p01386_3DC_v20_TechBrief_dec_11_2003_Rand_screen.pdf.*

Day, Martyn, AutoVue A foundation for view, markup and collaboration, Cimmetry Systems, Inc., http://www.cimmetry.com/whitepapers/AutoVue_a_Foundation_for_View_Markup_and_Co.

Wu, Shin-Ting et al., Interactive 3D Geometric Modelers with 2D UI, 2002, State University of Campinas, www.dca.fee.unicamp.br, Sao Paulo, Brazil.

Bade, Ragnar et al., Usability Comparison of Mouse-based Interaction Techniques for Predicatable 3d Rotation, Aug. 2005, http://ifgi.uni-muenster.de/~kruegera/sg05/135.pdf/.

* cited by examiner

*Primary Examiner*—Leo Picard
*Assistant Examiner*—Charles Kasenge
(74) *Attorney, Agent, or Firm*—Shewchuk IP Services; Jeffrey D. Shewchuk

(57) ABSTRACT

Any issues associated with manufacture of a part are identified and highlighted on a part model. A software method and system then uses motion of the part model for communicating the manufacturability issues to the customer. The motion can include a repositioning of a part rendering to a preferred orientation position, a fly-around so the customer can appreciate the next zoom location, and then a zooming in on the issue desired to be shown. Alternatively or in conjunction with the zooming and fly-around motion, the orientation of the part rendering showing the manufacturability issues can be three-dimensionally manipulated such as with a click-drag-drop command of the customer's computer mouse. By adding a moveable aspect to the communication, customers can much better understand which changes are recommended or required of the part.

20 Claims, 10 Drawing Sheets

FIG. 2

MANIPULATABLE MODEL FOR COMMUNICATING MANUFACTURING ISSUES OF A CUSTOM PART

CROSS-REFERENCE TO RELATED APPLICATION(S)

None.

BACKGROUND OF THE INVENTION

The present invention relates to software supported methods, systems and tools used in the design and fabrication of molds for custom plastic parts, and in presenting information to customers for the customer to make selections to help minimize the cost of the mold and running the customer's part.

Injection molding, among other types of molding techniques, is commonly utilized to produce plastic parts from molds. Companies and individuals engaged in fabricating molds are commonly referred to as "moldmakers." The moldmaking art has a long history of fairly gradual innovation and advancement. Molds are designed pursuant to a specification of the part geometry provided by a customer; in many cases, functional aspects of the plastic part also need to be taken into account. Historically, moldmaking involves at least one face-to-face meeting between the moldmaker and the customer, with complex communication between the moldmaker and the customer and complex decisions made by the moldmaker regarding the construct of the mold. More recently, this process has been automated to a significant degree, to assist in transmitting information between the moldmaker and/or the moldmaker's computer system and the customer, thereby realizing significant efficiencies and corresponding price reductions in the manufacture of molds and custom molded parts.

Such automation is described in U.S. patent application Ser. Nos. 11/338,052, 11/114,893, 11/074,388, 11/035,648, 10/970,130, 10/325,286 (now issued as U.S. Pat. No. 6,836, 699), and 10/056,755 (now issued as U.S. Pat. No. 6,701, 200).

While this automation has greatly improved the process of identifying manufacturability issues, communicating those issues to the customer and quoting manufacture of the mold and/or part, problems still remain. One particular remaining problem is a difficulty of customers in understanding where on a part a particular problem or needed change is located. With the face-to-face meetings between the moldmaker and the customer of the prior art, customers and moldmakers could work through the communication issues with pointing or similar gestures, on-the-fly sketches, and give-and-take dialogue characteristic of face-to-face communication. To automate the process so no moldmaker-customer face-to-face meeting is necessary, clear communication is vitally important. Sometimes the identified problem or needed change is on a small detail of the part. Sometimes the change is only well shown on an unusual viewing angle. Clearer methods of communication between the moldmaker and the customer are needed, particularly when communicating small details or unusual viewing angles. The clearer methods of communication should permit transmission via computer and without real-time face-to-face personal interaction.

BRIEF SUMMARY OF THE INVENTION

The present invention is a software method and system for communicating manufacturability issues, which is particularly applicable to a customer's part to be injection molded. Rather than communicate solely using fixed images and text, the present invention utilizes motion of a part model in explaining what changes or adjustments should be made to the part to increase part quality, reduce injection molding expenses or make injection molding possible. In one aspect, portions of the part model are highlighted, and a flight pattern is provided which first shows the customer a recognizable orientation of the part and then flies to show the issue location. In another aspect, the part model provided to the customer is user manipulatable such as with a click-drag-drop command of the customer's computer mouse. By adding a moveable aspect to the communication, customers can much better understand which changes are recommended or required of the part.

BRIEF DESCRIPTION OF THE DRAWINGS

FIGS. 2 and 3 show a computer screen with communication of mold/part manufacturability issues in accordance with a preferred embodiment of the present invention.

While the above-identified drawing figures set forth one or more preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
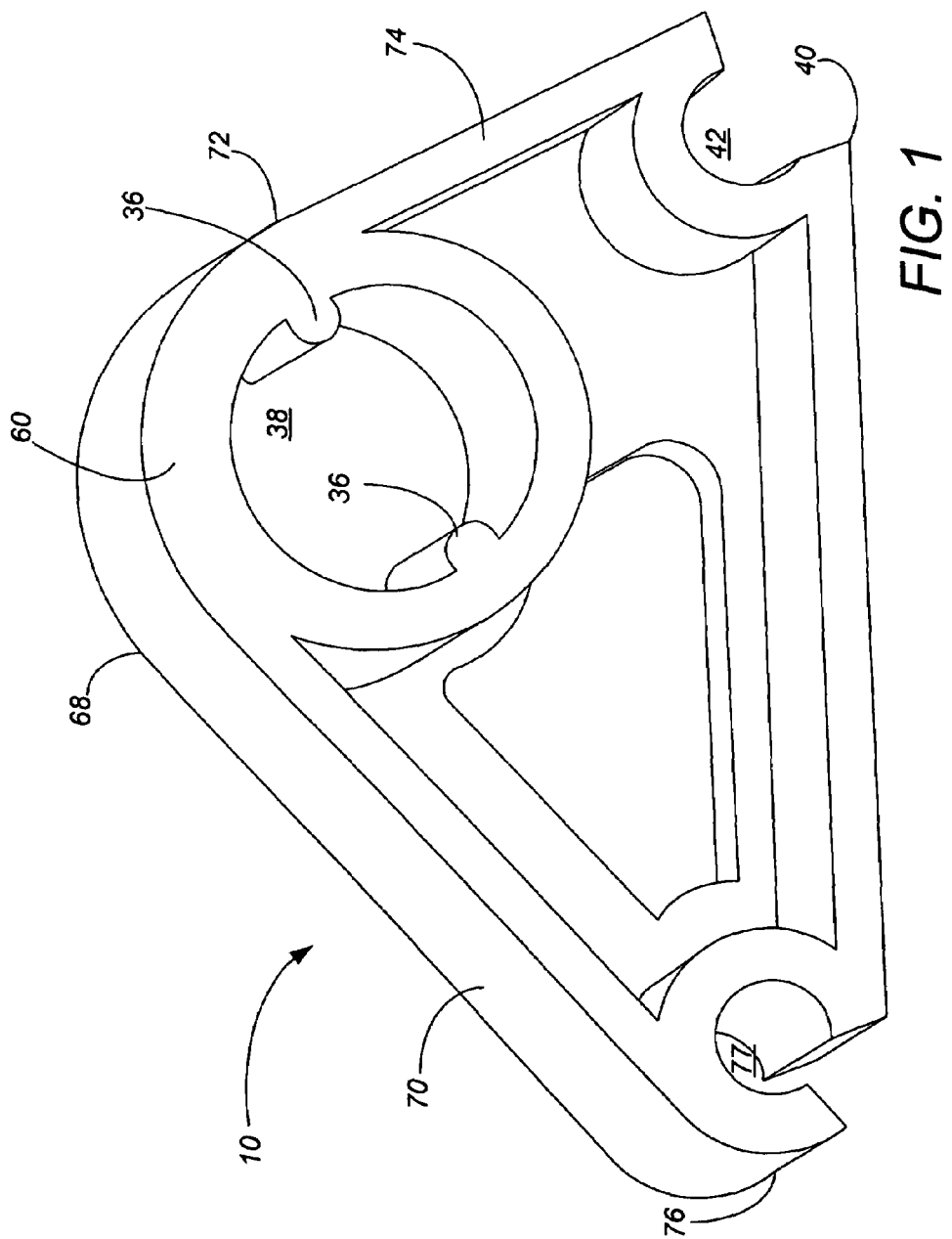
FIG. 1 is a perspective view of an exemplary "cam" part desired by a first customer.

FIG. 1 shows an exemplary part 10 for discussion purposes of the inventive way to communicate issues associated with the manufacture of that part 10. In this example, the part 10 is a "cam" part custom designed by a customer named John One. In part because the cam 10 is custom-designed (i.e., not a staple article of commerce) by or for this particular customer, the cam 10 includes numerous features, none of which have commonly accepted names. Without commonly accepted names for these features, verbal communication about changes to one or more features of the cam part 10 is difficult. The present invention is particularly contemplated as a better way to communicate changes or injection molding requirements of the part.

The quoting of the mold and/or manufacture for the part 10 may generally proceed with automated systems and methods such as described in U.S. patent application Ser. No. 11/338,052, 11/114,893, 11/074,388, 11/035,648, 10/970,130, 10/325,286 (now issued as U.S. Pat. No. 6,836, 699), and 10/056,755 (now issued as U.S. Pat. No. 6,701, 200), all incorporated by reference herein. In these applications, a basic step is receiving customer part data comprising a CAD file for the part 10 to be molded, with the CAD file defining a part surface profile. The part 10 is custom designed by or for the customer, and its shape is unknown at the time the computer system housing the invention and software of the invention is finalized.

While the software analysis of the customer's CAD file may be a stand-alone feature offered on a website or provided in other ways to the customer, in this example the context of receiving the customer's CAD file is that John One requested a quote, i.e., John One is interested in learning how much it would cost to injection mold twenty-five cams 10 for testing. John One provided his CAD file and filled out various menu fields associated with the requested quotation, including his name 12 and the part name 14, how many cavities 16 will be included on the mold block, surface finishes 18 on the A-side and B-side of the mold, how many samples 20 are desired, the delivery time 22 in which the samples are needed, and the material 24 which will be used in injection molding the part 10.

In this example, the software analysis of the customer's CAD file has identified several issues associated with manufacture of the cam part 10. For instance, the cam part 10 may have failed one or more criteria established in a geometry analyzer module. In this example, the analysis of the customer's CAD file has identified two "Required Changes" issues 26 which require significant changes to the part shape, three "Moldability Advisory" issues 28 which do not require changes to the part shape but are alerts, and three items of other information 30 of which the customer should be advised. After the issues are identified, the next step is to communicate those issues to the customer. Because the CAD file was submitted to obtain a quote but the part 10 failed the computer analysis, the issues are communicated to the customer on a quote response form 32 which advises the customer that changes are required. The quote response form 32 accordingly does not provide the customer with pricing for manufacture of the mold and/or manufacture of the parts 10, and includes blanks 34 for the pricing information.

One preferred way of communicating the issues to the customer is through a real time responsive website. However, delays in analysis, or performing portions of the analysis with moldmaker/operator input may require a slower form of communication. For example, the quote form information 32 depicted in FIGS. 2-10 could be provided via an e-mail, on a mailed or hand-delivered storage medium such as a disk, or through a delayed transmission of a link to a website server. The preferred embodiment has been tested and implemented to operate using a WINDOWS operating system utilizing an INTERNET EXPLORER internet browser, with .NET FRAMEWORK 2.0 and MANAGED DIRECTX FOR MICROSOFT .NET 2.0 components as well as viewer software installed on the customer's computer, with such components being deliverable for self-extracting installation via an internet connection. Regardless of the way in which the information is delivered to the customer, the information of the present invention is always delivered via computer and viewed on a computer.

The present invention will be described with regard to two "Required Changes" issues requiring correction of the customer's CAD file before the quotation procedure can continue. In this example, one of the rotation pins 36 in the circular opening 38 had insufficient draft, and one of the edges 38 of the 60° corner hole 42 had an inadequate radius. It would be nearly impossible to communicate these failures to the customer, in a way that the customer would quickly understand and appreciate how to make changes to the part 10 to correct the failures, using strictly verbal communication. In Applicant's prior art system, the information was communicated using static images which showed the locations of failure highlighted with color or otherwise identified so the customer would see where the changes were needed. However, even with such images, customers may have difficulty appreciating where the changes need be made, particularly if the changes are relatively small. The present invention adds motion to the images so the customer can better identify the areas requiring change.

Figure 2:
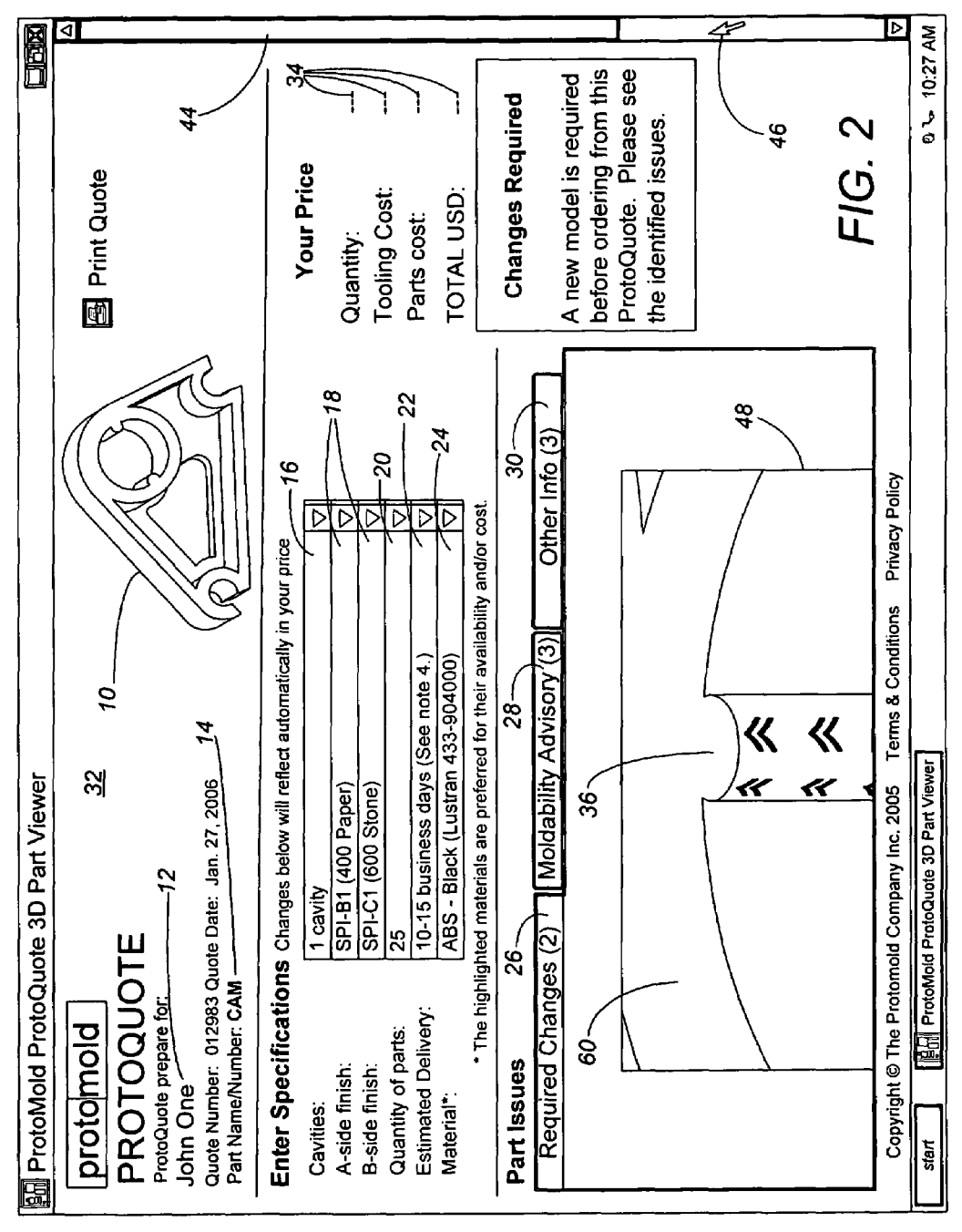
Figure 3:
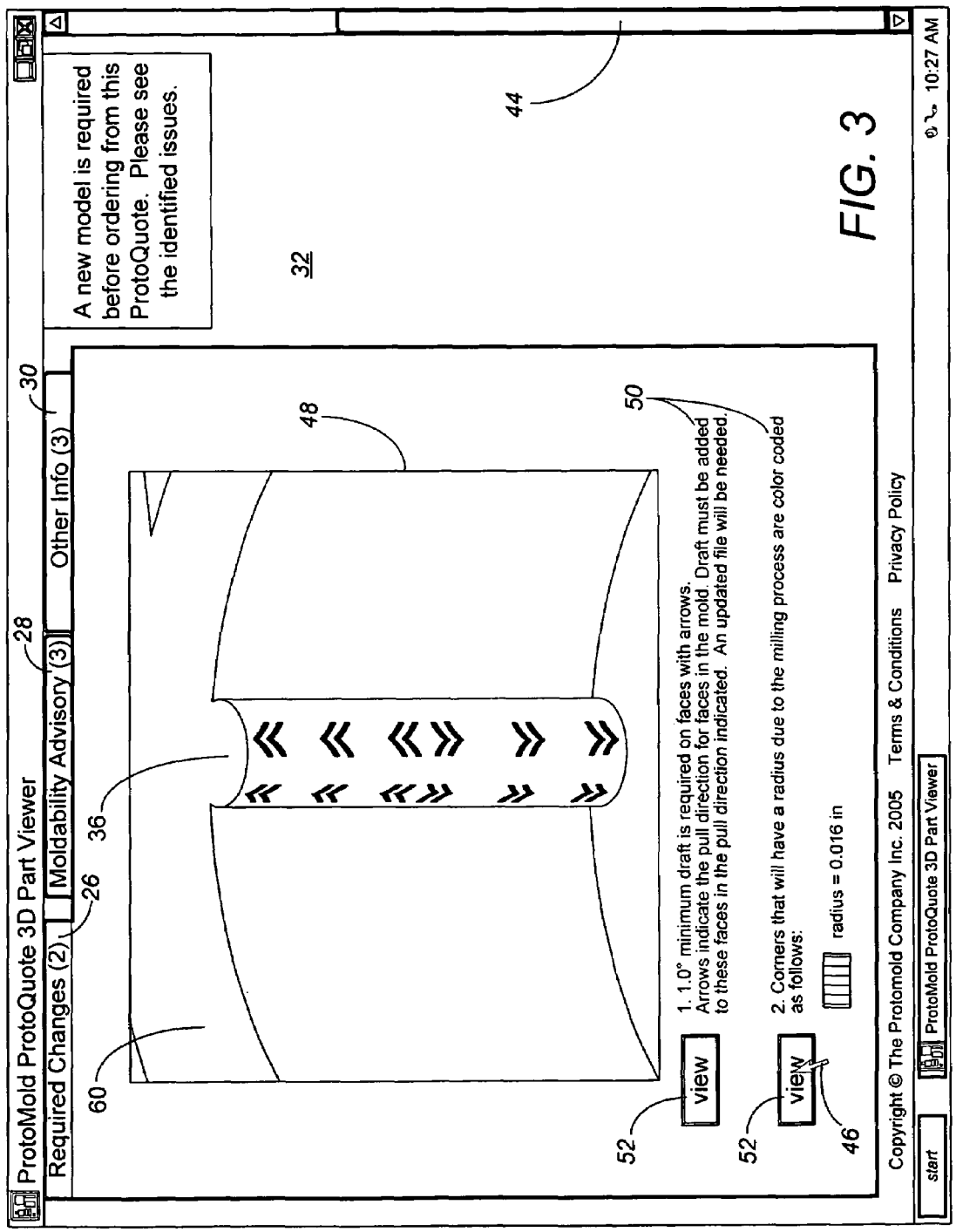

As shown at the bottom of FIG. 2 and better in FIG. 3 after the customer has clicked on the scroll bar 44 with a mouse pointer 46, the various issues may be provided on a viewing screen area 48. In the preferred embodiment, separate tabs are provided for the "Required Changes" 26, "Moldability Advisory" 28 and "Other Info" 30. When the customer clicks on any of these tabs 26, 28, 30, the customer is provided with an active view area 48 above and text 50 below for each of the issues identified. As shown in FIG. 3, the default first screen for the active view area 48 is the first identified issue requiring change to the customer's CAD file, that of the rotation pin 36 requiring additional draft. The active view area screen 48 shows this issue on the portion of the part 10 affected in large size.

The second identified issue has to do with a minimum radius at a corner 40 of the part 10. FIGS. 4-9 show a sequence disclosing what happens in the preferred embodiment when the customer clicks on a view button 52 indicating that the customer wants to view the second identified issue.

Upon clicking the view button 52, the active view area 48 begins motion which changes the view of the part 10, much like a flight path of a miniature flying camera. In general terms, a first set of motions provides the customer with visual cues on the part 10 so the customer can easily discern the orientation of the part 10 as shown. After sufficient orientation information is provided, a second set of motions highlights and enlarges the selected issue in the active view area 48.

Figure 4:
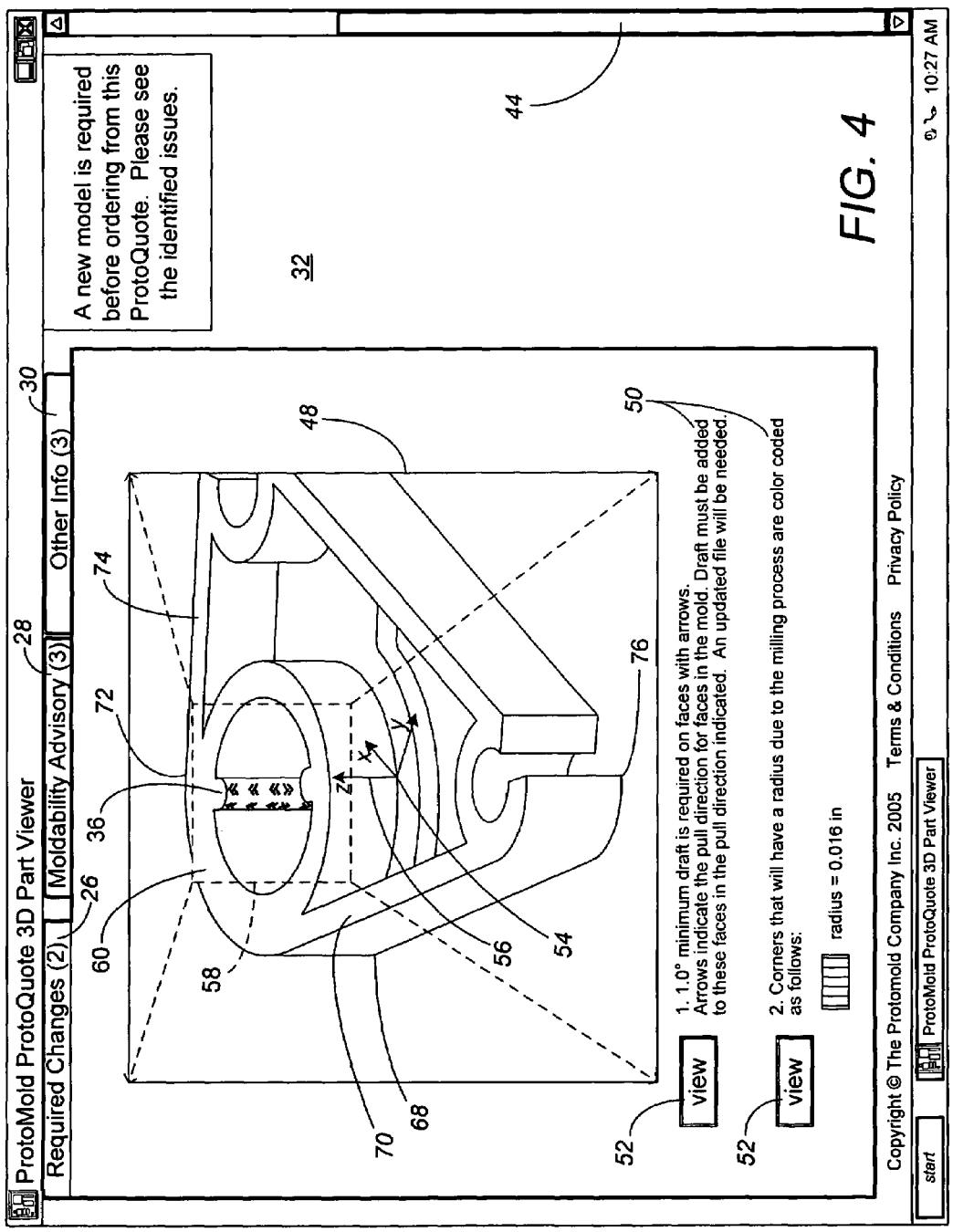
FIGS. 4-9 show views of the computer screen of FIG. 3 in time steps following the customer's clicking of a "view" button to see the required changes of a second identified issue.

FIG. 4 shows a first time step in the flight path, which is generally changing the size (zoom), and possibly position (pan) of active view area 48 from the initial screen of FIG. 3. In the preferred embodiment, this involves zooming to a position that shows at least a majority, if not the entirety, of the part 10. In the analysis of moldability, x-, y- and z-axes for the part 10 were determined. The axes of the part 10 may be determined by hand or as described in U.S. Pat. Nos. 6,836,699 and 6,701,200 or otherwise through software analysis to best match the way the part 10 will be formed in the injection mold. The preferred "orientation position" is one with the z-axis directed upward, with 0° slant but tilted 30° toward the viewer. Additionally, the preferred orientation position places a center of the part 10 in the center of the active view area 48. This can be easily done in the software by selecting/positioning the intersection of the x-, y- and z-axes in the center of the part 10 and using the intersection of the x-, y- and z-axes as a center of rotation 54. In the preferred embodiment, the intersection of the x-, y- and z-axes and the center of rotation 54 are shown on the part 10 with a center of rotation symbol 56. The preferred center of rotation symbol 56 is a set of arrows that show the x-, y- and z-axes of the part 10. Each of the arrows may be displayed in different colors or otherwise labeled so the viewer can identify which axis is which. The preferred placement of the center of rotation 54 is at or near the center of the part 10, but on a face (and more preferably on an edge of the part 10 where two faces intersect) rather than internal to the part 10. FIG. 4 shows the center of rotation symbol 56 in this position. Placing the center of rotation 54 on a surface of the part 10 rather than in the interior of the part or at some imaginary location which is off the part helps the flight path achieve an intuitive look and feel to so users can more easily understand the viewpoint being shown. Once the z-axis is so directed and positioned, the preferred initial "orientation position" does not require any further rotation of the x- and y-axes: any position of the x-axis and y-axis is considered sufficient.

Because the first identified issue showed an image which had the z-axis generally directed upward (0° slant) at a tilt angle close to 30° the flight path from the initial view of FIG. 3 to the initial orientation position is simple, merely involving zooming out while recentering. The recentering (panning) during the zoom out was only slightly to the right and about 20% of the part 10 downward. This recentering places the center of rotation symbol 56 directly at the centerline of the active view area 48, both up and down and left and right. FIG. 4 includes dashed lines 58 to depict this flight path from the initial screen size.

The purpose of the initial orientation position is so the user can readily identify the orientation of the part 10. If the first identified issue had been at a different orientation other than with the z-axis directed upward (0° slant) and a 30° tilt, the "zooming back" movement of the active view area 48 would have rotated the z-axis to the preferred orientation position. As shown in FIG. 4, the initial orientation position need not show the full extent of the part 10, but should show enough of the part 10 that the user can readily identify the orientation of the part 10 as shown in the active view area 48. As will be seen through FIGS. 5 and 6, the center of rotation 54 equates to a point on the part 10 that does not move during the "fly around", with the rest of the part 10 pivoting or rotating around the center of rotation 54.

The 0° slant, 30° tilt position of the z-axis provides a natural viewpoint for injection molded parts. Alternatively, the orientation position could have the z-axis directed at a different tilt or slant, or could be based upon either the x- or the y-axis of the part 10. Because injection molded parts are most commonly viewed with the z-axis directed straight up, the preferred orientation position performs very well in communicating most issues on most parts.

It is noted that FIG. 4 has zoomed back to a vantage point wherein the circular wall 60 conceals part of the view of the rotation pin 36 of interest in FIG. 3. That is, the viewpoint (camera position) of FIG. 3 is closer to the rotation pin 36 than the inside diameter of the circular wall 60. During the zooming out action, the lower portion of the screen 48 appears to pass through the circular wall 60 to the viewpoint shown in FIG. 4. Thus, the preferred embodiment has the capability of showing viewpoints (as shown in FIG. 3) which cannot be replicated on an actual part with a camera or the human eye, because no camera or eye is small enough to fit within the circular hole 38 and no camera or eye can pass through the circular wall 60.

Figure 5:
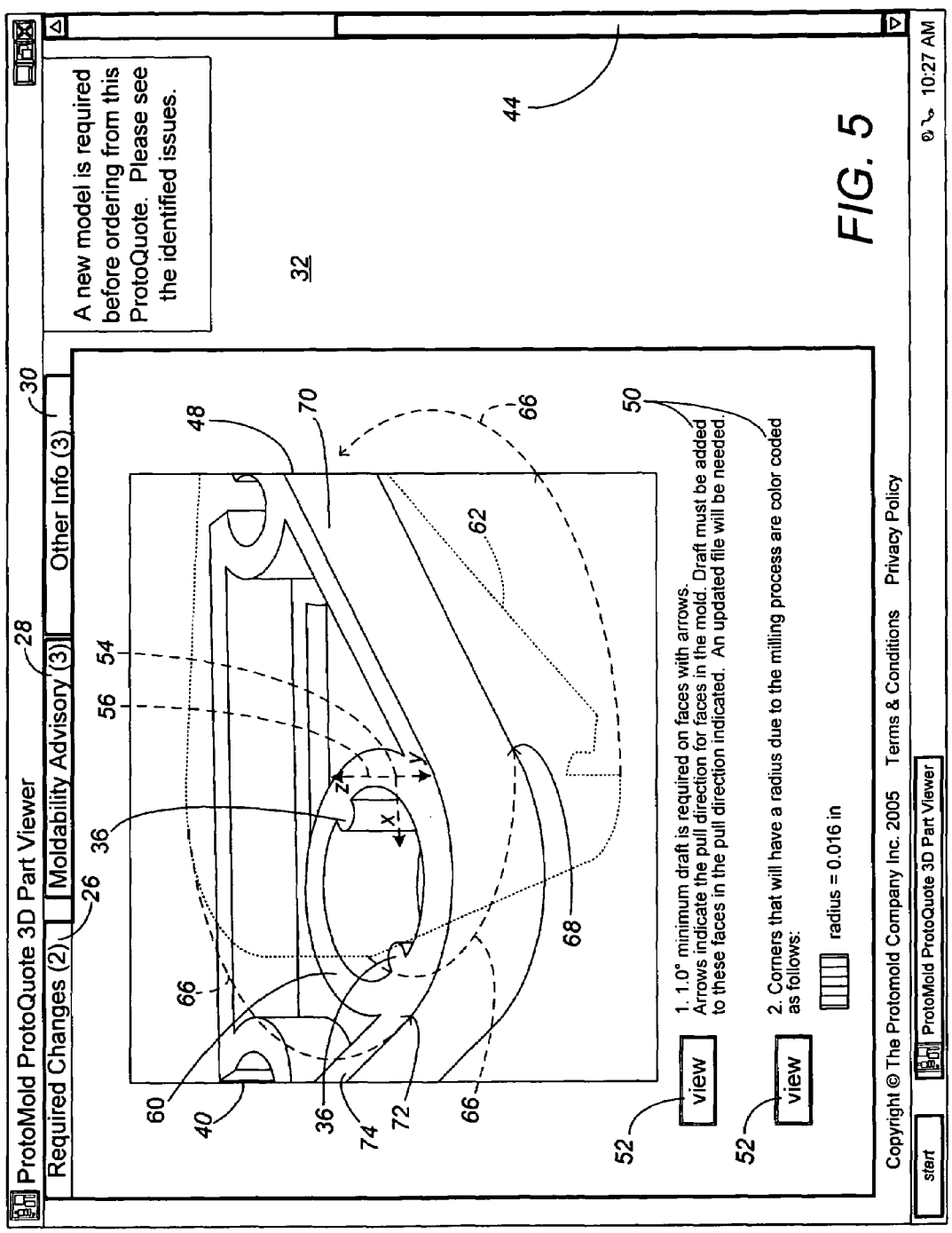
Figure 6:
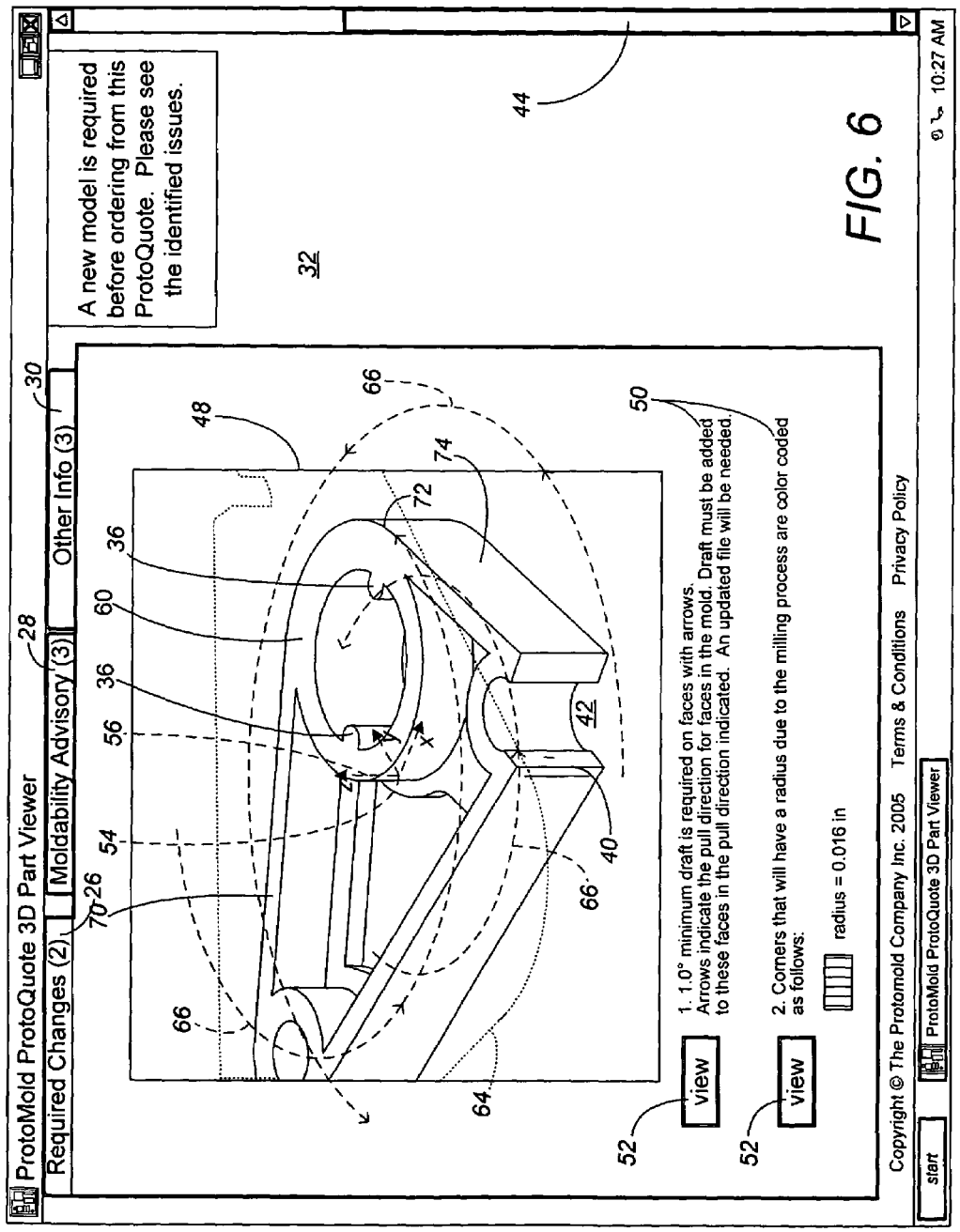

Once the part 10 is shown in the active view area 48 in the orientation position, the flight path continues to a viewpoint which highlights the next (i.e., the corner radius) issue. In this example, the movement to the second issue is more complex than the movement from the first issue to the orientation position. In the preferred embodiment, the movement to the second issue starts with a fly-around shown in FIGS. 5 and 6. FIG. 5 shows in dotted lines the outline 62 (shown only for descriptive purposes, not present in the actual software) of the part 10 from its location in FIG. 4. FIG. 6 shows in dotted lines the outline 64 (shown only for descriptive purposes, not present in the actual software) of the part 10 from its location in FIG. 5. The fly-around rotates the part 10 about the z-axis for an amount between 180 and 360°. Throughout this fly-around, the z-axis is held at a 0° slant, 30° tilt position, the center of rotation 54 (and the center of rotation symbol 56) is kept in the center of the active area 48, and the part size (zoom) is not modified. Accordingly, the fly-around takes the part 10 through a progression of view angles such that each point on the part 10 travels in a horizontal ellipse about the z-axis. The elliptical travel paths 66 of three points is mapped in dashed lines (shown only for descriptive purposes, not present in the actual software) from FIG. 4 though FIG. 6: a point 68 at the bottom of the cam 10 where the straight, 30° wall 70 meets the outer diameter of the circular wall 60, a point 72 at the top of the cam 10 where the straight, 60° wall 74 meets the outer diameter of the circular wall 60, and a point 76 at the bottom of the cam 10 at the corner of the 30° hole 77. With this fly-around, the part 10 is rotated so the next issue is shown in the center of the screen 48, in this example, directly under the z-axis. The fly-around is important so the customer can appreciate the vantage point for showing the next issue.

Figure 7:
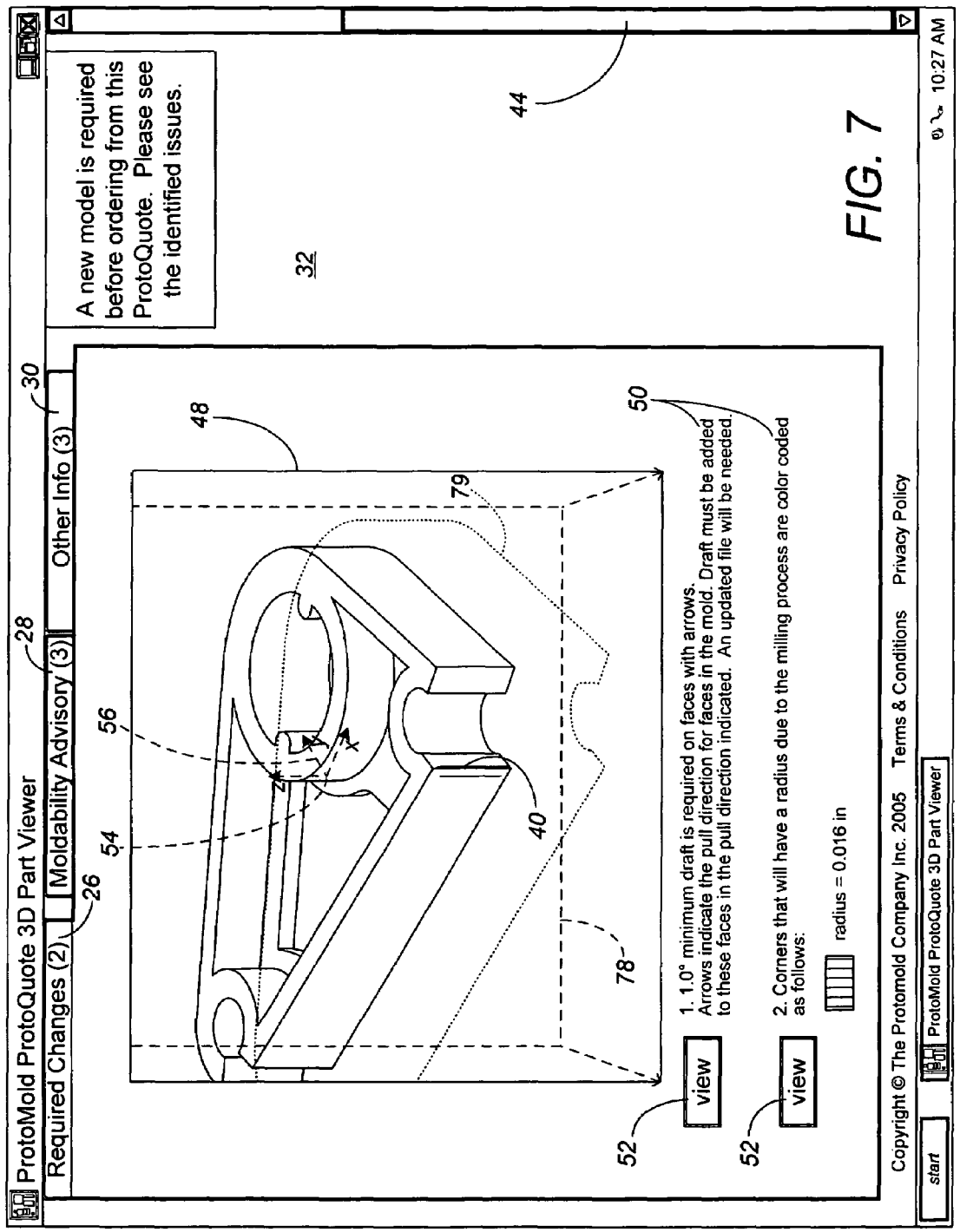
Figure 8:
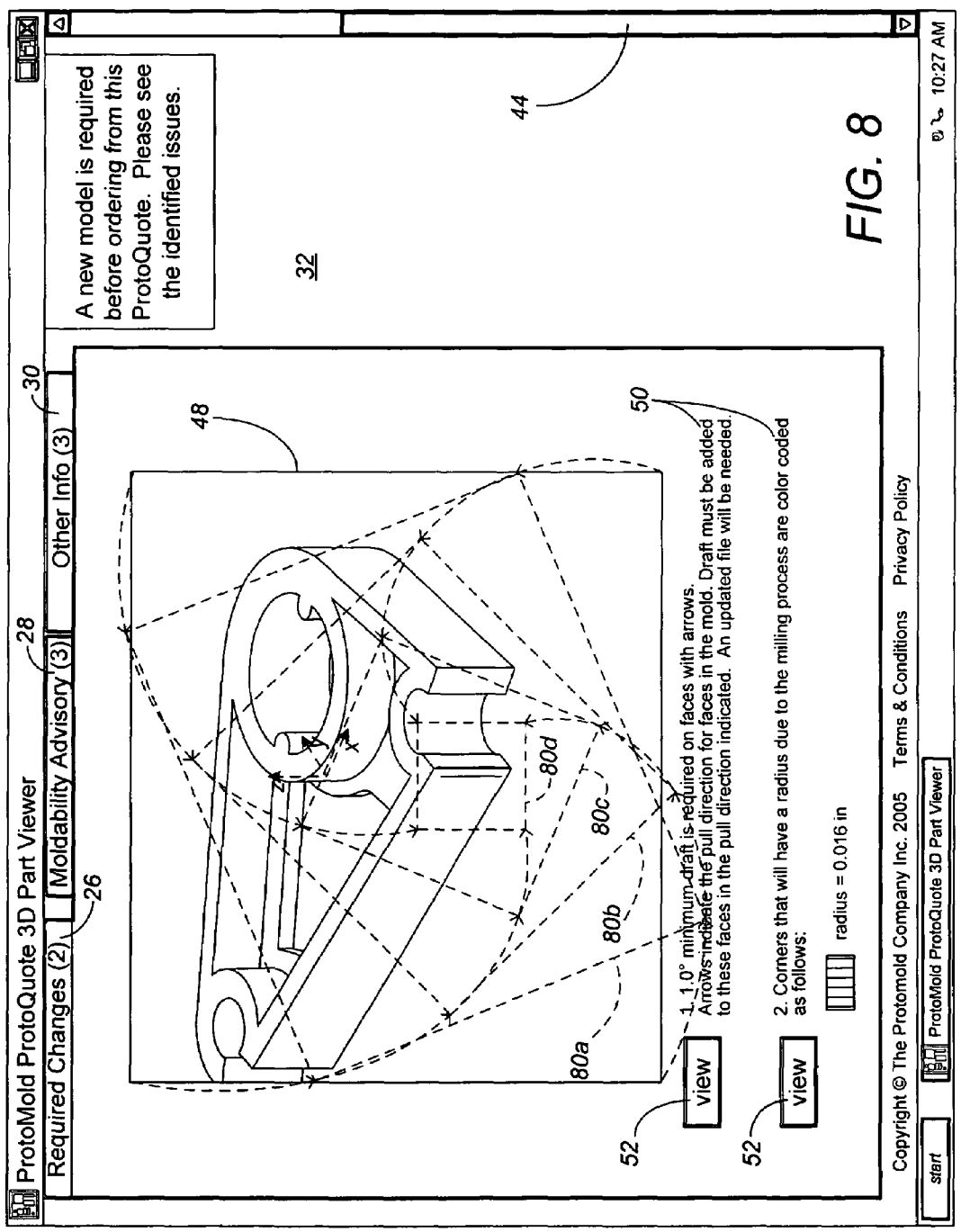
Figure 9:
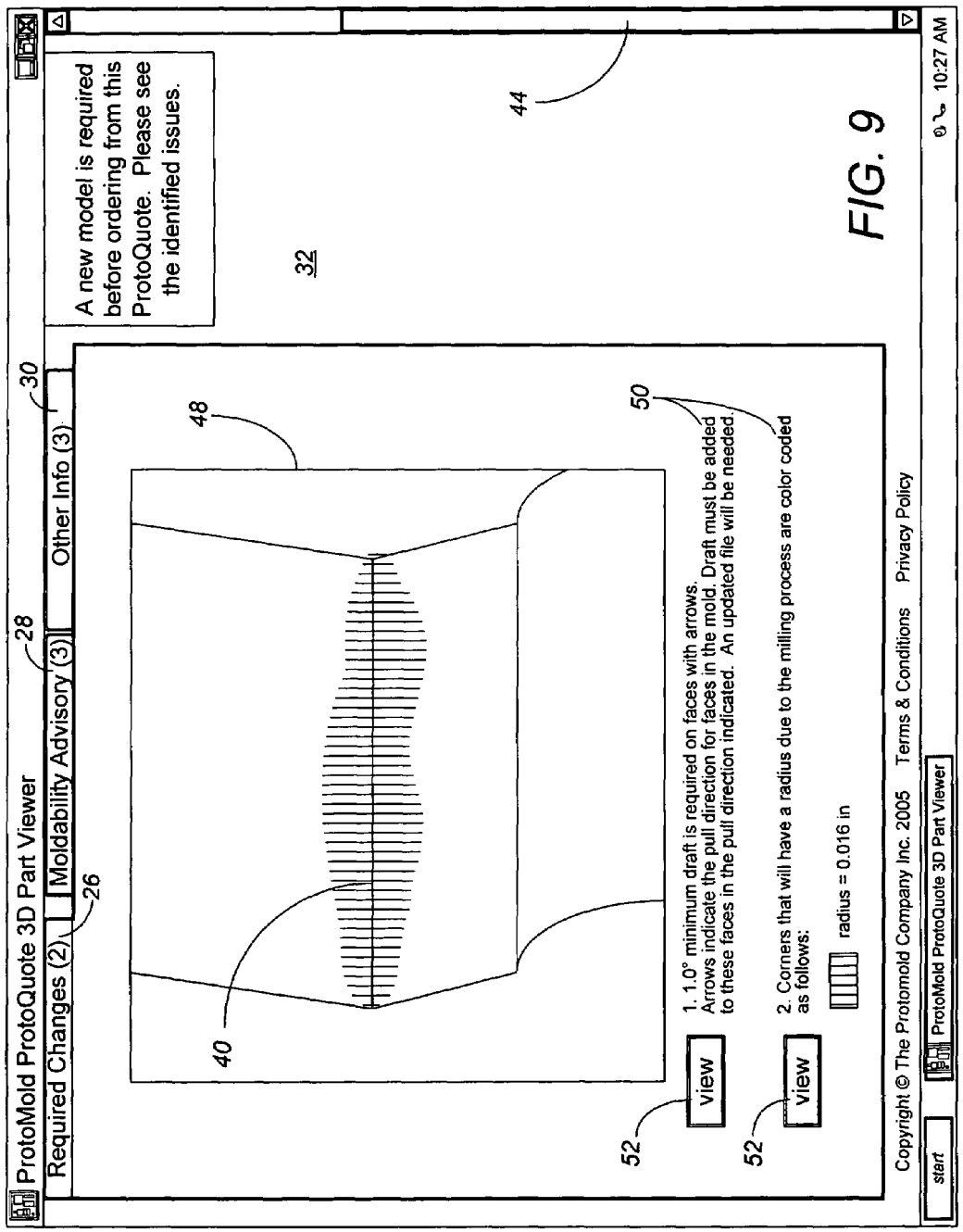

FIGS. 7 and 8 depict the repositioning from the end of the fly-around to the final position of FIG. 9 which shows the second issue in magnified scale. In this example, the corner 40 of the second issue is quite low in the active area 48 after the fly-around. This is addressed by a zoom-out, keeping the top of the screen constant and raising the part 10 during the zoom-out. To the viewer, this appears to be a movement of the camera position backing up on a horizontal line away from the z-axis. FIG. 7 shows this zoom out in dashed lines 78, and shows in dotted lines the outline 79 of the cam 10 as positioned in FIG. 6 (lines 78 and 79 both shown only for descriptive purposes, not present in the actual software).

FIG. 8 depicts the zooming in on the second issue. In this example, the desired viewpoint for the second issue takes the z-axis out of the vertical orientation to a horizontal orientation. Once the camera viewpoint has backed up enough that the second issue is about halfway to the center of the screen 48 from its position after the fly-around, the zoom in also involves a pan the rest of the way downward and a rotation of the image on the screen 48 (about an axis perpendicular to the plane of the screen 48). The extent of the active area 48 at three intermediate time steps are shown in dashed lines 80a, 80b, 80c before the final reaching the final position 80d of FIG. 9.

When the final position of FIG. 9 is reached, the customer readily understands the orientation of what is being shown on the part 10, because the motion involved with the fly-around and zoom in has oriented the customer to understand what is being highlighted. Even if the customer would not readily recognize the static image of FIG. 9 absent motion, the viewing motion of the present invention assists the customer in understanding the issue being communicated.

Once the final position of FIG. 9 highlighting the second issue is reached, the motion of the active view area 48 stops. In the preferred embodiment, the entire time sequence from clicking the view button 42 (FIG. 3) to the stoppage of motion (FIG. 9) occurs quickly, such as in a time period of about 2 to 3 seconds. If the customer now clicks on "view" for the first issue, the series of motions reverses itself to play back to the first issue: first the view area zooms out and reorients the z-axis to the orientation position, does a minimum 180° fly-around to center on the selected issue, and then zooms in on the selected issue.

If the customer clicks on the "view" button 52 for an issue already being shown, the same general process is followed: first the view area zooms out and reorients the z-axis to the orientation position, a 360° fly-around is performed, and then the view area zooms back in on the selected issue.

If three or more issues are provided under the currently selected tab 26, 28, 30, then the order of showing issues is up to the viewer. For instance, clicking on the "Moldability Advisory" tab 28 in our example would present explanatory text and "view" buttons for three other issues, and clicking on the "Other Info" tab 30 in our example would present explanatory text and "view" buttons for three more issues. In each case when a "view" button 52 is selected, the view area zooms out and reorients the z-axis to the orientation position, does a minimum 180° fly-around to center on the selected issue, and then zooms in on the selected issue.

Figure 10:
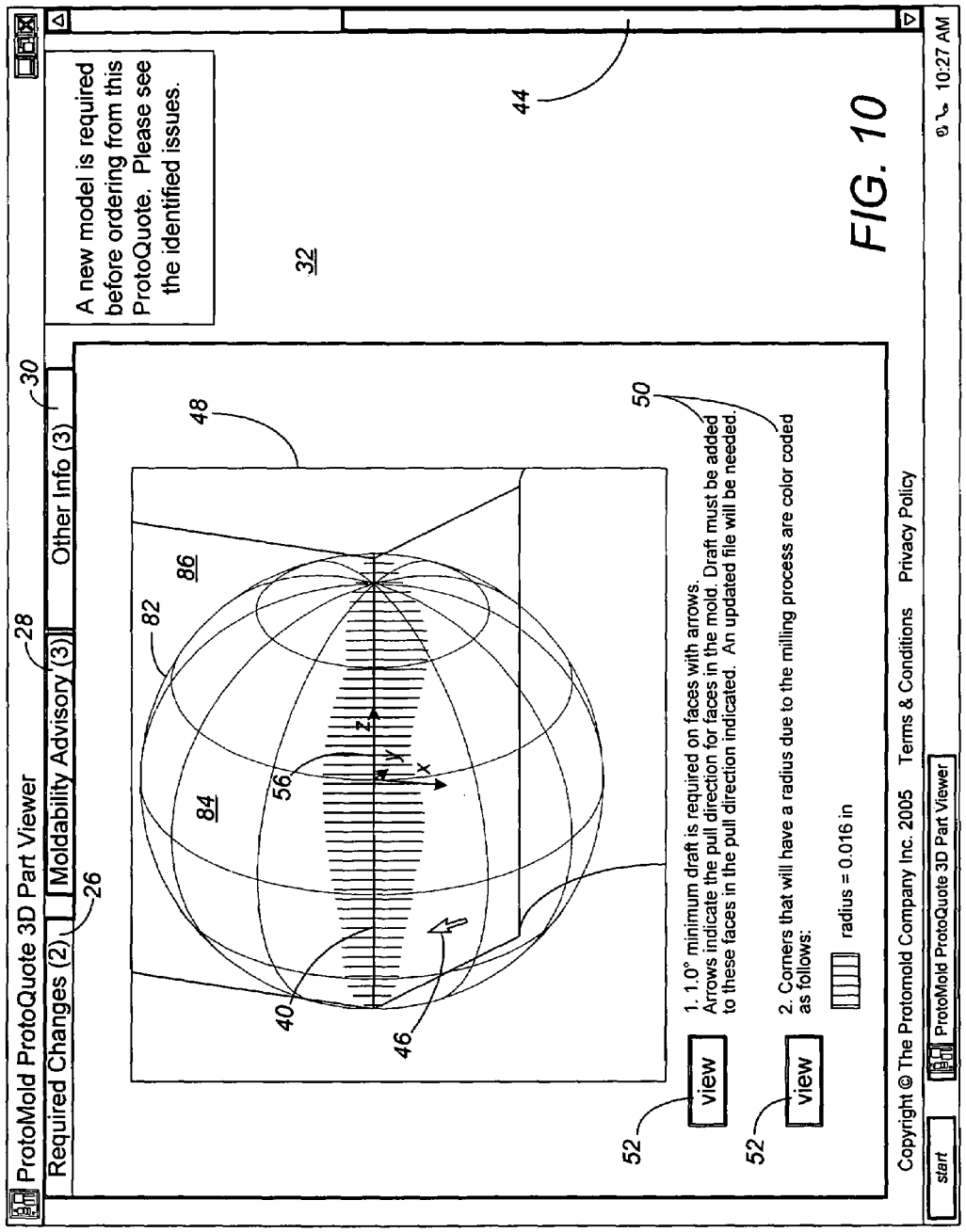
FIG. 10 depicts a customer's use of three-dimensional manipulation of the second identified issue.

FIG. 10 highlights a second preferred way of using motion to communicate part issues to the customer. In FIG. 10, after the static image of FIG. 9 is reached, the customer can manipulate the part rendering through a "click-drag-drop" command of the computer mouse. When the customer clicks anywhere on the active view area 48, the customer is provided with a three-dimensional manipulation capability to reorient the part 10 as shown on the screen 48 and thereby examine the highlighting of the selected issue. The preferred three-dimensional manipulation algorithm is a portion of the graphical user interface and manipulation software disclosed in App. No. P439.12-14, incorporated by reference herein. Using this preferred three-dimensional manipulation algorithm, left clicking causes an orientation globe 82 to appear, defining a first active area 84 and a second active area 86 on the screen 48 for mouse-based manipulation of the part 10. The preferred manipulation algorithm includes pan features based upon a right click-drag-drop command of the mouse, and includes zoom features based upon operation of a scroll wheel of the mouse. The preferred manipulation algorithm does not include any ability to highlight or color portions of the part rendering. The customer is provided with a viewer housing the preferred manipulation algorithm, which is a shorter download than the complete three-dimensional manipulation software. Alternatively, a different set of features or a complete set of features may be included with the customer download version.

When it is desired to give the customer feedback with regard to the part 10 and how well it will work for injection molding, the customer is provided with a simplified CAD file data set enabled in the simplified three-dimensional viewer. Each issue is then stored merely by recording the location (x-, y- and z-coordinates), zoom, and orientation (x-, y- and z-directions) which best show the issue. Storage of the location, zoom and orientation information can be performed either automatically by the software conducting the manufacturability criteria assessment, or by an operator selecting a position, zoom and orientation to best show each issue as identified by the manufacturability criteria assessment.

Although the present invention has been described with reference to preferred embodiments, workers skilled in the art will recognize that changes may be made in form and detail without departing from the spirit and scope of the invention.

The invention claimed is:

1. A method for communicating issues associated with manufacture of a part, comprising:

receiving customer part data comprising a CAD file for the part, the CAD file defining a part surface profile;

assessing the CAD file for compliance with constraints of a manufacturing method for making the part, the assessing act identifying sections of the part surface profile which have manufacturability issues; and providing the customer with a computer rendering of the part which highlights the sections having identified manufacturability issues, the computer rendering being manipulatable on a computer screen by the customer in zoom, angle or pan so the customer can better locate the sections having identified manufacturability issues on the part surface profile, wherein the computer rendering is manipulatable through a programmed flight pattern stopping on an issue location, with the programmed flight pattern being provided to the customer.

2. The method of claim 1, wherein the programmed flight pattern zooms in on the issue location before stopping.

3. The method of claim 1, wherein the programmed flight pattern rotates the part before stopping on the issue location.

4. The method of claim 3, wherein the rotation is at least 180°.

5. The method of claim 3, wherein the programmed flight pattern tilts a z-axis of the part rendering toward a viewer during the rotation.

6. The method of claim 5, wherein the z-axis of the part is tilted 30° toward the viewer and at a 0° slant during the rotation.

7. The method of claim 1, wherein the issue location comprises a viewpoint set in orientation, location and size to show the manufacturability issue.

8. The method of claim 7, wherein the viewpoint is selected by an operator.

9. The method of claim 7, wherein the viewpoint is computer selected.

10. The method of claim 1, wherein the computer rendering is manipulatable in zoom, angle and/or pan by a user using a "click-drag-drop" command of a computer mouse.

11. The method of claim 1, wherein the manufacture of the part is through injection molding, wherein the CAD file is assessed for compliance with constraints of injection molding, and wherein the identified manufacturability issue is failure to meet a geometry criterion of an injection molding process.

12. The method of claim 1, further comprising:

providing the customer with a quotation for manufacture of one or more parts and/or a mold for the part conforming in shape to the part surface profile at locations other than the sections having manufacturability issues.

13. The method of claim 1, wherein the computer rendering of the part and the programmed flight pattern are provided to the customer over the internet.

14. A method for communicating issues associated with manufacture of a part, comprising:

receiving customer part data comprising a CAD file for the part, the CAD file defining a part surface profile;

assessing the CAD file for compliance with constraints of a manufacturing method for making the part, the assessing act identifying sections of the part surface profile which have manufacturability issues; and providing the customer with a computer rendering of the part which highlights the sections having identified manufacturability issues, the computer rendering being manipulatable on a computer screen by the customer in zoom, angle or pan so the customer can better locate the sections having identified manufacturability issues on the part surface profile, wherein the computer rendering is manipulatable through a programmed flight pattern stopping on an issue location, wherein the programmed flight pattern zooms out from the issue location before proceeding to highlight a second issue location.

15. The method of claim 14, wherein the computer rendering is manipulatable in zoom, angle and/or pan by a user using a "click-drag-drop" command of a computer mouse.

16. A method for communicating issues associated with manufacture of a customer's part, comprising:
- identifying one or more sections of a part surface profile for the customer's part which have manufacturability issues;
- highlighting the sections having identified manufacturability issues on a part rendering;
- storing orientation information associated with one or more viewpoints which show each highlighted manufacturability issue; and
- providing the customer with a viewer having a programmed flight pattern to move the part rendering as shown on a computer screen to each stored orientation.

17. The method of claim 16, wherein the viewer provided to the customer also permits the customer to manipulate the part rendering on a computer screen in zoom, angle or pan.

18. A method for communicating issues associated with injection molding of a customer's part, comprising:
- identifying one or more sections of a part surface profile for the customer's part which have injection molding manufacturability issues;
- storing orientation information associated with one or more viewpoints which show each identified injection molding manufacturability issue; and
- providing the customer with a part rendering of the customer's part on a computer screen, the part rendering having a viewpoint which is movable to better show each identified injection molding manufacturability issue, wherein the viewpoint of the part rendering moves in a flight pattern between each of the stored orientations, with the flight pattern being provided to the customer.

19. The method of claim 18, wherein the viewpoint of the part rendering is movable through a rotation command utilizing a click-drag-drop path of a mouse pointer.

20. The method of claim 18, wherein the part rendering provided to the customer is manipulatable by the customer on a computer screen in zoom, angle or pan.

* * * * *